Patented Nov. 3, 1953

2,658,038

UNITED STATES PATENT OFFICE 2,658,038

DISULFOXIDES

Wayne A. Proell, Chicago, Ill., assignor to Standard Oil Company, Chicago, Ill., a corporation of Indiana No Drawing. Application December 21, 1949, Serial No. 134,361

9 Claims. (Cl. 252—161)

1

This invention relates to new compositions of matter, namely certain alpha,delta-disulfoxides. More particularly, this invention relates to disulfoxides having the structure

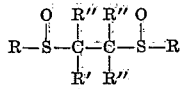

wherein R is an alkyl radical containing 1 to 3 carbon atoms, inclusive, R' is an alkyl radical containing 6 to 20 carbon atoms, inclusive, and R'' is selected from the class consisting of hydrogen and alkyl radicals containing from 1 to 6 carbon atoms inclusive.

A vast variety of chemical compounds has been studied from the standpoint of surface activity (note for example A. M. Schwartz and J. W. Perry "Surface Active Agents," published by Interscience Publishers, Inc. N. Y., 1949). There appears, however, to have been no appreciation before my invention that certain alpha,delta-disulfoxides possess surface activity; that they are surface active was quite unexpected since thioethers are not known to exhibit any surface activity and dithioethers and disulfones likewise exhibit no appreciable surface activity.

I have made the surprising discovery that disulfoxides of the above general formula are surface active compounds and have, furthermore, discovered that certain members within the class of compounds represented by the above formula constitute a new class of non-ionic detergents.

One object of my invention is to provide the art with novel alpha,delta-disulfoxides. Another object of my invention is to provide the art with alpha,delta-disulfoxides having marked surface active properties. An additional object of my invention is to provide novel disulfoxides capable of functioning as wetting agents in aqueous solution or dispersion. Yet another object of my invention is to provide the art with novel alpha,delta-disulfoxides having marked detergent action. A further object of my invention is to provide novel alpha,delta-disulfoxides which are capable of markedly lowering the interfacial tension between water or aqueous solutions and hydrocarbon oils or greases. These and other objects of my invention will become apparent from the ensuing description thereof.

The surface active character of the compounds

2 of the present invention will be discussed in detail hereinafter, but attention at this point will be concentrated upon methods suitable for the preparation of the compounds.

In general the disulfoxides are prepared by synthetic methods involving:

(1) The preparation of an alpha,delta-dithioether;
(2) The oxidation of the alpha,delta-dithioether to the corresponding disulfoxide.

It should be understood, however, that the specific preparative method employed forms no part of the present invention and that examples of preparative methods hereinafter set forth are merely for purposes of illustration.

Thus, alpha,delta-dithioethers can be synthesized by the reaction of a metal salt of a mercaptan with an alkyl dihalide. For example, the reaction of sodium ethyl mercaptide with ethylene dibromide has been described in the literature (Ber. 4, 716 (1871)) and may be extended to higher olefin dibromides, for example the dibromide of 1-dodecene. The converse of the above-described synthesis method would involve the reaction of a vicinal dimercaptide with 2 mols of an alkyl halide.

Still another method for the synthesis of alpha,delta-dithioethers, and one which I greatly prefer, involves the reaction of an olefin with a dialkyl disulfide at temperatures between about 0 and 150° F. in the liquid phase in the presence of an acidic condensation catalyst, for example HF, BF₃ or H₂SO₄, as described and claimed in application for Letters Patent S. N. 755,456 filed June 18, 1947, by D. A. McCaulay and A. P. Lien, now U. S. Patent 2,519,586. Even acid-activated clays have been in some instances proved to be suitable catalysts for the reaction of an olefin with a dialkyl disulfide to produce alpha,delta-dithioethers. While the use of iodine as a catalyst for the reaction of an olefin with a dialkyl disulfide has been described (B. Holmberg, C. A. 34, 2341-2 (1940)), this method is not one of general application and convenience, although it may be useful in specific instances.

In synthesizing dithioethers for the purposes of the present invention by the reaction of an olefin with a dialkyl disulfide, I can employ olefins from a considerable variety of sources. Thus, acyclic olefins containing 10 to 22 carbon atoms, inclusive, can be produced by:

(1) Cracking processes, for example by high temperature vapor phase cracking of paraffin wax or the like;

(2) By catalytic dehydrogenation of the corresponding paraffin hydrocarbons, for example with metal oxides of group 5 to 8 of the periodic table supported on alumina, magnesia or similar supports, specific examples being chromia-alumina and molybdena-alumina catalysts;

(3) By the catalytic polymerization of lower molecular weight olefins such as ethylene, propylene, butylenes, pentenes, hexenes, heptenes, octenes, etc., employing such polymerization catalysts as $AlCl_3$, $AlCl_3$-hydrocarbon complexes, phosphoric acid-kieselguhr, phosphoric acid supported upon a non-porous support such as glass or porcelain, liquid HF, HF—$BF_3$ and the like;

(4) By catalytic dehydrohalogenation of the corresponding alkyl halide, for example the demuriation of alkyl monochlorides derived by the chlorination of certain kerosene fractions;

(5) By the dehydration of the corresponding alcohols which may be produced by a variety of methods including catalytic hydrogenation of fats or fatty esters or sodium reduction of these materials, the Guerbet reaction or modification thereof, or catalytic dehydration of alcohols derived from the so-called Synol or Oxo processes;

(6) By processes for the reduction of carbon monoxide with hydrogen (the so-called Fischer-Tropsch, Synthine, Synthol or HCS processes) particularly in the presence of alkali-promoted iron catalysts, etc.

Examples of specific olefins which can be employed in the olefin-disulfide reaction are 1-dodecene, propylene tetramers such as can be readily prepared by the polymerization of propylene in the presence of phosphoric acid-kieselguhr catalysts, 1-dodecene, tridecenes such as can be prepared by the application of the Oxo process to a propylene tetramer to produce a mixture of tridecyl alcohols which are then catalytically dehydrated (for example by the use of an alumina catalyst), 1-tetradecene, 1-hexadecene, 1-octadecene, 2-octadecene.

Examples of suitable dialkyl disulfides for employment in the olefin-disulfide reaction are dimethyl, diethyl, di-n-propyl, diisopropyl, methyl ethyl, methyl n-propyl, methyl isopropyl, ethyl n-propyl, ethyl isopropyl, n-propyl isopropyl.

In the second stage of operation the alpha,-delta-dithioether is oxidized to produce the corresponding disulfoxide. While a variety of oxidizing agents such as nitric acid, chlorine, etc. may be applied to this end, I have found that an extremely suitable and simple method involves the use of hydrogen peroxide, for example 30 percent hydrogen peroxide, together with glacial acetic acid, as will be described in certain specific examples hereinafter set forth.

Disulfoxides conforming to the above general formula, wherein R' is an alkyl radical containing from 6 to 10 carbon atoms function primarily as wetting agents, whereas when R' is an alkyl group containing 10 to 25 carbon atoms, inclusive, they function primarily as detergents for the removal of dirt, grease, oil, etc. from various textile materials such as cotton, silk, wool, rayon, nylon, cellulose acetate or other fabrics, or for the removal of dirt and oil from other surfaces, for example metallic surfaces. In general, it is possible to arrive at "tailor-made" alpha,delta-disulfoxides for a particular purpose, by careful selection of the various alkyl groups within the molecule. The alpha,delta-disulfoxides exhibit surface active properties when employed in aqueous solutions or dispersions in low concentrations between about 0.01 and about 0.5 percent by weight, although it will be understood that they can be employed up to or even beyond the limits of their solubility in water or aqueous solutions which may contain hydrotropic agents or coupling solvents, such as various alcohols, ketones, esters, sulfonic acids, etc.

As a specific example, 1-dodecene (1.1 mols) was reacted with dimethyl disulfide (2.0 mols) in the presence of 0.9 mols of ethanesulfonic acid for 4 hours at temperatures between 75 and 100° C. to produce 65 percent of the theoretical yield of 3-n-decyl-2,5-dithiahexane, which has the following skeletal structure:

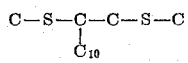

This dithioether (1.5 mols) was stirred with 300 cc. of glacial acetic acid, and then 360 g. of technical 30 percent hydrogen peroxide was added slowly while maintaining the temperature of the reacting mixture at 30° C. or lower by indirect heat exchange with a water bath. Upon completion of the reaction, volatile material (acetic acid, water and hydrogen peroxide) was evaporated to yield a viscous residual oil which crystallized on standing, M. P., about 30° C. The product was soluble in n-hexane. The following analyses indicate that the oxidation product was a disulfoxide, viz. 3-n-decyl-2,5-dithiahexane bis (2,5-oxide).

*Analysis*

|  | Found | Calc'd |
| --- | --- | --- |
| Percent S | 19.3, 19.5, 19.5 | 21.7 |
| Percent O | 10.0, 10.25 | 10.9 |

Further oxidation of the disulfoxide with hydrogen peroxide at 80–100° C. in glacial acetic acid yielded a disulfone melting about 115° C., having the following analysis:

|  | Found | Calc'd |
| --- | --- | --- |
| Percent S | 18.7, 18.9 | 19.6 |
| Percent O | 20.2, 20.2, 19.8 | 19.6 |

The addition of 0.2 weight percent of the disulfoxide to water reduced the surface tension from 72 to 30 dynes per square cm. This disulfoxide is a very good wetting agent by the Draves-Clarkson test. In addition, this disulfoxide was found to have very good rewetting properties, fair detergency for cotton fabric by the Crowe method (Am. Dyestuff Reporter, vol. 32, No. 11 (1943)), and foamed very little. A 0.1 weight percent solution of the disulfoxide was quite effective in washing dirty cotton cloth even when 0.5 gram of calcium chloride per 100 grams of solution was added, indicating its hard water effectiveness. I have noted that this disulfoxide removes oil from cotton very readily during agitation and allows oil to settle out when remaining quiescent. It is interesting that the corresponding disulfone is water-insoluble and completely non-detergent in its properties. It seems probable that the novel non-ionic detergent (3-n-decyl-2,5-dithiahexane bis (2,5-oxide)) and similar disulfoxides will avoid the difficulty now experienced in sewage works of excessive detergent action on the sewage, derived from household use of detergents, since bacterial oxidation or reduction of the disulfoxides of the present invention will yield non-detergent compounds exclusively, unlike conventional detergents.

The disulfoxide, 3-n-decyl-2,5-dithiahexane bis(2,5-oxide), not only markedly reduces the surface tension of water, but also greatly reduces the interfacial tension between water and hydrophobic substances such as hydrocarbon oils. In a test, 25 cc. of a commercial lubricating oil was rubbed on the hands, then 0.2 g. of the disulfoxide was rubbed into the oil and warm water was applied to the hands. The lubricating oil washed off perfectly and almost instantaneously leaving the hands clean, white and non-oily. The disulfoxides of the present invention, because of their non-ionic and chemically inactive nature, under ordinary conditions, do not cause irritation of the skin or defating of skin, hair or fur. When cold tap water is substituted for warm water in the above test, rapid and effective cleansing of the hands was likewise obtained.

In a further test, 0.1 g. calcium chloride was rubbed onto wet hands, 25 cc. of lubricating oil was then applied, following which 0.2 gram of the disulfoxide was applied and the hands were rinsed in cold water, resulting in the instantaneous removal of all traces of oil.

Twenty grams of 3-n-decyl-2,5-dithiahexane bis(2,5-oxide) was dissolved in 1 liter of water and the resultant solution was used to clean an engine block. The engine compartment had not been cleaned for about 1 year, at which time an unsuccessful attempt to clean it had been made with an alkarylsulfonic acid-type commercial detergent. The motor, at the time of test, was badly soiled. The carburetor and fuel pump were covered with a layer of oily grease about 2 mm. thick; the motor block proper had a thin, very dry coat of black grease on top, grading into a thick, oily grease coat on the side. The ignition wiring also was badly greased. Certain parts, notably the steering column, were covered with a ¼ inch layer of grease. A white stiff brush was immersed in the above detergent solution and applied directly to as much of the engine compartment as possible. The entire block, wiring, spark plugs, upper steering column, generator, fuel pump, and carburetor were scrubbed well. Then a stream of water was played on the engine compartment. All the dirt washed off, cleanly and instantly, wherever the detergent had been applied. The results were particularly striking on such spots as the carburetor, which normally must be removed and boiled in alkali to clean it; and on the steering column, where a ¼ inch layer of grease was completely removed. An additional feature was that on completion of the cleaning operation, the brush was rinsed in cold tap water, and it was then snow white. The operator's hands were black with grease from accidental contact with the block. Ten drops of the residual detergent were poured on the hands, and all the dirt at once floated away. Previous tests indicated that several gallons of kerosene were needed to accomplish the same job as done by the above simple application of a novel detergent composition of the present invention. Moreover, the motor started immediately, as soon as the hose was removed from the motor. Apparently the detergent allows a very thin water-repellent film to adhere to ignition parts, as usually a simple hosing of the engine requires that the ignition be hand-dried before the engine can be started.

By the same method employed for the synthesis of 3-n-decyl-2,5-dithiahexane bis(2,5-oxide), I have likewise prepared 3-n-hexadecyl-2,5-dithiahexane bis(2,5-oxide). This compound was characterized by rather low solubility in water at room temperature, fair foaming and good cotton detergency. A surprising result was obtained with 3-n-hexyl-2,5-dithiahexane bis(2,5-oxide) which showed a mild degree of detergency for oil. Usually a chain as short as C6 will not show any action; 3-methyl-2,5-dithiahexane bis(2,5-oxide) showed no detergency at all.

It will be apparent that the novel class of nonionic surface active agents described above can be applied to almost any of the myriad applications of surface active applications heretofore made or suggested and described in the large literature of the subject, for example in such texts as the Schwartz and Perry volume mentioned above and in C. B. F. Young and K. W. Coons "Surface Active Agents" (Chemical Publishing Co., Inc., 1945), and the like. It will be apparent that for various applications the surface active agents of the present invention can be combined with a considerable variety of other agents which may have surface active activity or other activity, for example insecticidal activity, dyeing properties, solvent properties, etc. Thus, the surface active disulfoxides of the present invention can be employed together with alkaline cleaning agents such as phosphates and silicates or with ionic detergents such as alkalies, carboxylate soaps, sulfonate soaps, alkyl sulfates, quaternary ammonium salts, ionic surface active compounds, other non-ionic surface active agents such as polyethylene oxide derivatives of alcohols, mercaptans, amides, or the like.

The surface active disulfoxides of the present invention may be employed in preparing various oil-water emulsions. The surface active disulfoxides of the present invention can be employed, for example, in various textile applications, such as in the various treatments, including dyeing operations, practiced upon such textile materials as cotton, wool, rayon, silk, linen and the like; they may be employed in conventional laundry practice, in metal and other industrial cleansing applications, in the treatment of leather, paper and the like, in the preparation of rubber latex, as emulsifying agents in polymerization processes, for the formulation of insecticidal emulsions; as penetrating, dispersing and levelling agents in dyeing; in pigment grinding; in ore flotation processes; in shampoos, and the like.

I have noted that the alpha,delta-disulfoxides of this invention have excellent metal wetting properties as well as a high capacity to suspend dirt and metal oxides such as ferric oxide. The disulfoxides of this invention may be employed in amounts between about 0.01 and about 10 percent by weight in lubricating oils, alone or together with other compounds capable of functioning as extreme pressure agents, antioxidants, detergents, corrosion inhibitors, antiwear agents, dyes, etc.

Having thus described my invention, what I claim is:

1. As a new composition of matter, a compound having the formula

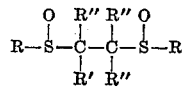

wherein R is an alkyl radical containing 1 to 3 carbon atoms, inclusive, R' is an alkyl radical containing 6 to 25 carbon atoms, inclusive, and R" is selected from the class consisting of hydrogen and alkyl radicals containing from 1 to 6 carbon atoms, inclusive.

2. A compound according to claim 1 wherein R" is hydrogen.

3. A compound according to claim 1 wherein R' is a straight-chain radical.

4. As a new composition of matter, a compound having the formula

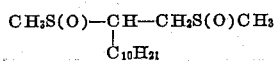

5. As a new composition of matter, a compound having the formula

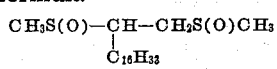

6. As a new composition of matter, a compound having the formula

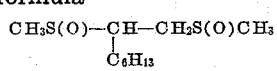

7. The method of cleansing a surface which comprises treating said surface with a composition having the formula

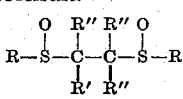

wherein R is an alkyl radical containing 1 to 3 carbon atoms, inclusive, R' is an alkyl radical containing 10 to 25 carbon atoms, inclusive, and R" is selected from the class consisting of hydrogen and alkyl radicals containing from 1 to 6 carbon atoms, inclusive.

8. An aqueous solution of a composition defined by claim 1.

9. A compound according to claim 1 wherein R is a methyl radical, R' is an alkyl radical containing 6 to 25 carbon atoms, inclusive, and R" is hydrogen.

WAYNE A. PROELL.

References Cited in the file of this patent

UNITED STATES PATENTS

| Number | Name | Date |
|---|---|---|
| 2,163,180 | Ufer | June 20, 1939 |
| 2,323,797 | Cook | July 6, 1943 |
| 2,391,087 | Donlan et al. | Dec. 18, 1945 |
| 2,453,022 | Leiserson | Nov. 2, 1948 |
| 2,519,586 | McCauley et al. | Aug. 22, 1950 |

OTHER REFERENCES

Whitmore: "Organic Chemistry," pages 161–165, D. Van Nostrand and Co., Inc., New York (1942).